United States Patent
Hsieh

(10) Patent No.: US 10,221,308 B2
(45) Date of Patent: Mar. 5, 2019

(54) RESIN COMPOSITION FOR LASER MARKING

(71) Applicant: Chi Mei Corporation, Tainan (TW)

(72) Inventor: Shang-Ju Hsieh, Tainan (TW)

(73) Assignee: CHI MEI CORPORATION, Tainan (TW)

( * ) Notice: Subject to any disclaimer, the term of this patent is extended or adjusted under 35 U.S.C. 154(b) by 51 days.

(21) Appl. No.: 15/422,518

(22) Filed: Feb. 2, 2017

(65) Prior Publication Data

US 2017/0226333 A1 Aug. 10, 2017

(30) Foreign Application Priority Data

Feb. 5, 2016 (TW) .............................. 105104123 A

(51) Int. Cl.
*C08L 25/14* (2006.01)
*C08F 212/08* (2006.01)

(52) U.S. Cl.
CPC ............ *C08L 25/14* (2013.01); *C08F 212/08* (2013.01); *C08L 2205/025* (2013.01); *C08L 2205/03* (2013.01); *C08L 2205/035* (2013.01)

(58) Field of Classification Search
CPC .............. C08L 25/14; C08L 2205/035; C08L 2205/025; C08L 2205/03; C08F 212/08
USPC ....................................................... 524/523
See application file for complete search history.

(56) References Cited

U.S. PATENT DOCUMENTS

| | | | | |
|---|---|---|---|---|
| 3,985,703 | A * | 10/1976 | Ferry ................... | C08F 265/04 |
| | | | | 523/201 |
| 6,420,449 | B1 * | 7/2002 | Sagane ................. | B41M 5/267 |
| | | | | 106/31.01 |
| 9,315,658 | B2 * | 4/2016 | Yang ....................... | C08L 33/12 |
| 2014/0039104 | A1 * | 2/2014 | Yang ..................... | C08F 279/04 |
| | | | | 524/228 |

FOREIGN PATENT DOCUMENTS

| | | |
|---|---|---|
| CN | 103476861 A | 12/2013 |
| JP | 2003176393 A | 6/2003 |
| JP | 2003176396 | 6/2003 |
| TW | 322492 | 12/1997 |
| TW | 201425349 A | 7/2014 |
| TW | I466904 | 1/2015 |
| TW | I481651 | 4/2015 |
| TW | 201525061 | 7/2015 |

OTHER PUBLICATIONS

TIPO Office Action dated May 25, 2017 in Taiwan application (No. 105144216).
TIPO Office Action dated Nov. 9, 2016 in corresponding Taiwan application (No. 105104123).

* cited by examiner

*Primary Examiner* — Michael Bernshteyn
(74) *Attorney, Agent, or Firm* — McClure, Qualey & Rodack, LLP

(57) ABSTRACT

A resin composition for laser marking includes a resin and laser absorbers. The resin includes 40%~83% (methyl) acrylate-styrene based copolymers (A), greater than 0 to 45% (methyl)acrylate based copolymers (B) and 5~35% core-shell copolymers (C) by weight. The laser absorbers include 0.01~0.25 parts of carbon black (D) for each 100 parts by weight of the resin. The (methyl)acrylate-styrene based copolymer (A) includes 40~80% (methyl)acrylate-containing monomer units, 20% to 60% styrene series monomer units and 0% to 30% other-polymerizable monomer units by weight. The (methyl)acrylate based copolymers (B) includes 92~99% methacrylate-type monomer units, 1~8% acrylate series monomer units and 0~7% vinyl-group-containing polymerizable monomer units by weight and has a weight-average molecular weight ranging from 70,000 to 150,000. Each core-shell copolymers (C) has a core portion that includes butadiene monomer units and (methyl)acrylate-containing monomer units and a shell portion that comprises (methyl)acrylate-containing monomer units at least partially covering the core portion.

19 Claims, No Drawings

RESIN COMPOSITION FOR LASER MARKING

This application claims the benefit of Taiwan application Serial No. 105104123, filed Feb. 5, 2016, the disclosure of which is incorporated by reference herein in its entirety.

TECHNICAL FIELD

The technical field relates to a resin composition, and more particularly to a resin composition for laser marking.

BACKGROUND

Traditionally, a polymer material (such as a plastic material used to form key pad) can be marked by ink jet printing. In order to enhance the ink adhesion, Freon (e.g. chlorofluorocarbon (CFC)) is used to clean the surface of the polymer material prior to the printing process. However, the use of CFC is restricted or inhibited in the resent years because of environmental concerns. Laser marking technology which requires no CFC surface cleaning step and has advantages of easy operation and leading permanent marks has been widely applied in the plastic polymer industry to take the place of the ink jet printing technology.

The laser marking technology can be implemented by steps as follows: A light absorber or heat absorbers is firstly added in a polymeric material, and a laser beam is directed to the polymeric material. The surface of the polymeric material that subjected to the laser beam may be foam decomposed or/and carbonized to change the surface profiles and to make the dye involved in the polymeric material turning white, so as to form a mark on the surface of the polymeric material. Typically, carbon black can be added to change the color of the mark from white to black during the laser marking process. However, carbon black may cause the foaming decomposition occurring in the polymeric material reacting more violently, and the color of the mark may change to brown rather than black due to the violent foaming decomposition. Whereby, the mark formed on the surface of the polymeric material may be blurred and unidentified.

Therefore, a novel resin composition for laser marking and method for fabricating the same are desired for providing a laser mark having a more distinct profile and sharper contrast formed on the polymeric material.

SUMMARY

One aspect of the present invention is to provide a resin composition for laser marking, wherein the resin composition includes a resin and laser absorbers. The resin includes 40% to 83% (methyl)acrylate-styrene based copolymers (A), 0 to 45% (methyl)acrylate based copolymers (B) and 10% to 35% core-shell copolymers (C) by weight of the resin. The laser absorbers include 0.01 to 0.25 parts of carbon black (D) for each 100 parts by sum of weights of (A), (B) and (C). The (methyl)acrylate-styrene based copolymer (A) includes 40% to 80% (methyl)acrylate-containing monomer units, 20% to 60% styrene series monomer units and 0% to 30% other-polymerizable monomer units by weight of (A). The (methyl)acrylate based copolymers (B) includes 92% to 99% methacrylate-type monomer units, 1% to 8% acrylate series monomer units and 0 to 7% vinyl-group-containing polymerizable monomer units by weight of (B) and has a weight-average molecular weight ranging from 70,000 to 150,000. Each of the core-shell copolymers (C) has a core portion and a shell portion at least partially covering the core portion. The core portion includes a material selected from a group consisting of butadiene monomer units, (methyl)acrylate-containing monomer units and the combination thereof. The shell portion is made of a material mainly selected from (methyl)acrylate-containing monomer units.

In some embodiments of the present invention, the resin includes 40% to 80% (methyl)acrylate-styrene based copolymers (A), 0 to 40% (methyl)acrylate based copolymers (B) and 10% to 30% core-shell copolymers (C) by weight of the resin.

In some embodiments of the present invention, the resin includes 40% to 80% (methyl)acrylate-styrene based copolymers (A), 2% to 40% (methyl)acrylate based copolymers (B) and 10% to 28% core-shell copolymers (C) by weight of the resin.

In some embodiments of the present invention, the shell portion of the core-shell copolymers (C) includes greater than 60% (methyl)acrylate-containing monomer units by weight of the shell portion.

In some embodiments of the present invention, the core portion of the core-shell copolymers (C) includes butadiene-containing core polymer. In some other embodiments of the present invention, the core portion of the core-shell copolymers (C) includes alkylacrylate-containing monomer units.

Another aspect of the present invention is to provide a resin composition for laser marking, wherein the resin composition includes a resin and laser absorbers. The resin includes (methyl)acrylate-styrene based copolymers (A) and core-shell copolymers (C). The laser absorbers include 0.01 to 0.25 parts of carbon black (D) for each 100 parts by sum of weights of (A) and (C). Each of the core-shell copolymers (C) has a core portion and a shell portion at least partially covering the core portion. The core portion made of a material manly selected from butadiene monomer units. The shell portion is made of a material mainly selected from (methyl)acrylate-containing monomer units. (Methyl)acrylate-containing monomer units and styrene series monomer units are respectively from the resin. The weight ratio of the (methyl)acrylate-containing monomer units to the styrene series monomer units both involved in the resin substantially ranges from 0.85 to 5. The resin composition include 12.5% to 21.5% butadiene monomer units by weight of the resin composition.

Another aspect of the present invention is to provide a molding product made of a resin composition for laser marking, wherein the molding product c includes a surface; and a mark, formed on the surface by a laser treatment. The resin composition includes a resin comprising 40% to 83% (methyl)acrylate-styrene based copolymers (A), 0 to 45% (methyl)acrylate based copolymers (B) and 10% to 35% core-shell copolymers (C) by weight; and laser absorbers comprising 0.01 to 0.25 parts of carbon black (D) for each 100 parts by weight of the resin. The (methyl)acrylate-styrene based copolymer (A) includes 40% to 80% (methyl)acrylate-containing monomer units, 20% to 60% styrene series monomer units and 0% to 30% other-polymerizable monomer units by weight of (A). The (methyl)acrylate based copolymers (B) includes 92% to 99% methacrylate-type monomer units, 1% to 8% acrylate series monomer units and 0 to 7% vinyl-group-containing polymerizable monomer units by weight of (B) and has a weight-average molecular weight ranging from 70,000 to 150,000. Each of the core-shell copolymers (C) has a core portion and a shell portion at least partially covering the core portion. The core portion includes a material selected from a group consisting of butadiene monomer units, (methyl)acrylate-containing monomer units and the combination thereof. The shell portion is made of a material mainly selected from (methyl) acrylate-containing monomer units.

By using the resin composition provided by above embodiments of the present invention as the polymeric material to be marked, a laser mark having a more distinct profile and sharper contrast can be formed on the surface of the resin composition.

DETAILED DESCRIPTION

The embodiments disclosed in the present specification relate to a resin composition for laser marking to provide a laser mark having a more distinct profile and sharper contrast formed on a surface thereof. For the above objects, features and advantages of the present invention to be clearly understood, several embodiments and detailed descriptions are disclosed below. However, it should be noted that the embodiments and methods exemplified in the present invention are not for limiting the scope of protection of the present invention. The present invention can be implemented by using other features, methods and parameters. Exemplary embodiments are disclosed for exemplifying the technical features of the present invention, not for limiting the scope of protection of the present invention. Anyone who is skilled in the technology field of the disclosure can make necessary modifications or variations according to the descriptions of the present specification without violating the spirit of the present invention.

In accordance with one embodiment of the present invention, a resin composition for laser marking is provided, wherein the resin composition includes resin and laser absorbers. The resin includes 40% to 83% (methyl)acrylate-styrene based copolymers (A), 0 to 45% (methyl)acrylate based copolymers (B) and 10% to 35% core-shell copolymers (C) by weight of the resin. The laser absorbers include 0.01 to 0.25 parts of carbon black (D) for each 100 parts by sum of weights of (A), (B) and (C). The (methyl)acrylate-styrene based copolymer (A) includes 40% to 80% (methyl) acrylate-containing monomer units, 20% to 60% styrene series monomer units and 0% to 30% other-polymerizable monomer units by weight of (A). The (methyl)acrylate based copolymer (B) includes 92% to 99% methacrylate-type monomer units (a1-1), 1% to 8% acrylate series monomer units (a1-2) and 0 to 7% vinyl-group-containing polymerizable monomer units by weight of (B); and (B) has a weight-average molecular weight ranging from 70,000 to 150,000. The core-shell copolymer (C) has a core portion and a shell portion at least partially covering the core portion. The core portion includes a material selected from a group consisting of butadiene monomer units, (methyl)acrylate-containing monomer units and the combination thereof. The shell portion is made of a material mainly selected from (methyl)acrylate-containing monomer units.

In some other embodiments of the present invention, the resin composition includes resin and laser absorbers. The resin includes (methyl)acrylate-styrene based copolymers (A) and core-shell copolymers (C). The laser absorbers include 0.01 to 0.25 parts of carbon black (D) for each 100 parts by sum of weights of (A) and (C). The (methyl) acrylate-styrene based copolymer (A) includes 40% to 80% (methyl)acrylate-containing monomer units, 20% to 60% styrene series monomer units and 0% to 30% other-polymerizable monomer units by weight of (A). Each of the core-shell copolymers (C) has a core portion and a shell portion at least partially covering the core portion. The core portion made of a material manly selected from butadiene monomer units. The shell portion is made of a material mainly selected from (methyl)acrylate-containing monomer units. (Methyl)acrylate-containing monomer units and styrene series monomer units are respectively from the resin. The weight ratio of the (methyl)acrylate-containing monomer units to the styrene series monomer units both involved in the resin substantially ranges from 0.85 to 5. The resin composition include 12.5% to 21.5% butadiene monomer units by weight of the resin composition. In another embodiment of the present invention, the weight ratio of the (methyl)acrylate-containing monomer units to the styrene series monomer units both involved in the resin substantially ranges from 0.9 to 4.9. In one embodiment of the present invention, the resin includes 35% to 75% (methyl)acrylate-containing monomer units by weight of the resin. In one embodiment of the present invention, the resin includes 10% to 50% styrene series monomer units by weight of the resin.

In the embodiments of the present invention, the so called "monomer units" is a structure composed of repeat units of a monomer resulted from a polymerization.

The detailed contents for composing the resin composition and the pertinent descriptions thereof will be disclosed below:

(A) (Methyl)Acrylate-Styrene Based Copolymers

In one embodiment of the present invention, the (methyl) acrylate-styrene based copolymer (A) includes 40% to 80% (methyl)acrylate-containing monomer units (a1), 20% to 60% styrene series monomer units (a2) and other-polymerizable monomer units (a3) by weight of (A). In some embodiments of the present invention, the (methyl)acrylate-styrene based copolymer (A) includes 40% to 75% (methyl) acrylate-containing monomer units, 25% to 60% styrene monomer units.

The (methyl)acrylate-styrene based copolymer (A) has a weight-average molecular weight ranging from 100,000 to 200,000, and preferably ranging from 130,000 to 170,000. The melt flow index (MI or MFI) of the (methyl)acrylate-styrene based copolymer (A) may range from 1.2 g/10 min to 2.4 g/10 min (using ASTM method to measure the melt viscosity at 200° C. with a 5 kg load). The softening temperature of the (methyl)acrylate-styrene based copolymer (A) may range from 100° C. to 110° C. It can be indicated that the (methyl)acrylate-styrene based copolymer (A) has excellent processing characteristics and good thermal stability.

Preferably, the (methyl)acrylate-styrene based copolymer (A) are formed by a copolymerization using 42% to 72% (methyl)acrylate-containing monomer units (a1) and 28% to 58% styrene series monomer units (a2) by weight of (A) as the start material; and 0 to 30% other-polymerizable monomer units (a3) by weight of (A) may be added depending on the need of the processing condition.

The (methyl)acrylate-containing monomer units (a1) used to synthesis the (methyl)acrylate-styrene based copolymer (A) can be (but not limited to) the monomer units composed of (1) methacrylate-type monomer units (a1-1), such as methyl methacrylate (MMA), ethyl methacrylate, n-propyl methacrylate, n-butyl methacrylate, n-pentyl methacrylate, cyclohexyl methacrylate, n-heptyl methacrylate, octadecyl methacrylate, phenyl methacrylate, benzyl methacrylate or 2-ethylhexyl methacrylate, (2) acrylate series monomer units (a1-2), such as (but not limited to) methyl acrylate, ethyl acrylate, propyl acrylate, butyl acrylate, pentyl acrylate, cyclohexyl acrylate, heptyl acrylate, dodecyl acrylate, phenyl acrylate benzyl acrylate or 2-ethylhexyl acrylate, (3) hydroxyl-group-containing methacrylate-type monomer units (a1-3), such as (but not limited to) glyceryl monomethacrylate or 2-hydroxyethyl methacrylate, or the arbitrary combinations thereof. In one embodiment of the present invention, the (methyl)acrylate-containing monomer units (a1) used to synthesis the (methyl)acrylate-styrene based copolymer (A) can be selected from a group consisting of (1) (but not limited to) methacrylate-type monomer units (a1-1), (2) acrylate series monomer units (a1-2), (3) hydroxyl-group-containing methacrylate-type monomer units (a1-3) and the arbitrary combinations thereof. In one embodiment of the present invention, the (methyl)acrylate-containing monomer units (a1) used to synthesis the (methyl)acrylate-styrene based copolymer (A) can be selected from a group consisting of MMA monomer units, ethyl methacrylate monomer units, n-butyl methacrylate monomer units and the arbitrary combinations thereof.

The styrene series monomer units (a2) used to synthesis the (methyl)acrylate-styrene based copolymer (A) can be (but not limited to) the monomer units composed of styrene, (1) halogen-substituted styrene, such as (but not limited to) chlorostyrene series monomers or bromostyrene series monomers, (2) alkyl-substituted styrene, such as (but not limited to) vinyl toluene, α-methyl styrene, p-tert-butylstyrene, p-methyl styrene, o-methyl styrene, m-methyl styrene, 2,4-dimethyl styrene or ethyl styrene, or the arbitrary combinations thereof. In one embodiment of the present invention, the styrene series monomer units (a2) used to synthesis the (methyl)acrylate-styrene based copolymer (A) can be copolymerized monomer units selected from a group consisting of (but not limited to) styrene monomer units, (1) halogen-substituted styrene monomer units, (2) alkyl-substituted styrene monomer units and the arbitrary combinations thereof. In one embodiment of the present invention, the styrene series monomer units (a2) used to synthesis the (methyl)acrylate-styrene based copolymer (A) can be the copolymerized repeat units of styrene monomers, α-methyl styrene monomers or the combination thereof.

The other-polymerizable monomer units (a3) used to synthesis the (methyl)acrylate-styrene based copolymer (A) can be (but not limited to) the monomer units composed of (1) unsaturated carboxylic acid or acid anhydride, such as (but not limited to) acrylic acid, methacrylic acid, maleic acid, itaconic acid, citraconic acid or aconitic acid, (2) maleimide monomers, such as (but not limited to) maleimide, N-Methylmaleimide, N-isopropyl maleimide, N-butyl maleimide, N-hexyl maleimide, N-octyl maleimide, N-dodecyl maleimide, N-cyclohexyl maleimide, N-phenyl maleimide, N-2,3-dimethyl phenyl maleimide, N-2,4-dimethyl phenyl maleimide, N-2,3-diethyl phenyl maleimide, N-2,4-diethyl phenyl maleimide, N-2,3-dibutyl phenyl maleimide, N-2,4-dibutyl phenyl maleimide, N-2,6-dimethyl phenyl maleimide, N-2,3-dichlorophenyl maleimide, N-2,4-dichlorophenyl maleimide, N-2,3-dibromophenyl maleimide or N-2,4-dibromophenyl maleimide, (3) allyl-group-containing copolymers which can be selected from a group consisting of acrylamide, acrylonitrile, α-methyl acrylonitrile, allyl glycidyl ether, glycidyl methacrylate and the arbitrary combinations thereof, (4) vinyl-group-containing copolymers, such as vinyl acetate or chloroethene, or the arbitrary combinations thereof. The other-polymerizable monomer units (a3) used to synthesis the (methyl)acrylate-styrene based copolymer (A) preferable can also be selected from a group consisting of acrylonitrile monomer units, maleic acid anhydride monomer units and the arbitrary combinations thereof.

In one embodiment, by adjusting the contents of the aforementioned monomer units, the softening temperature of the (methyl)acrylate-styrene based copolymer (A) can be controlled in a preferred range from 100° C. to 110° C.

In one embodiment of the present invention, the (methyl)acrylate-containing monomer units (a1) used to synthesis the (methyl)acrylate-styrene based copolymer (A) preferably is mainly composed of MMA. In some embodiment, the amount of MMA involve in the methacrylate-type monomer units (a1-1) is greater than 80% by weight of (a1). While, the (methyl)acrylate-styrene based copolymer (A) includes 40% to 80% (methyl)acrylate-containing monomer units by weight of (A), the amount of MMA involve in the (methyl)acrylate-styrene based copolymer (A) is greater than 32% by weight of (A).

(B) (Methyl)Acrylate Based Copolymer

The (methyl)acrylate based copolymer (B) may include (1) methacrylate-type monomer units, (2) acrylate series monomer units and (3) vinyl-group-containing polymerizable monomer. The (methyl)acrylate based copolymers (B) includes 92% to 99% methacrylate-type monomer units, 1% to 8% acrylate series monomer units and 0 to 7% vinyl-group-containing polymerizable monomer units by weight of (B). The (methyl)acrylate based copolymer (B) has a weight-average molecular weight ranging from 50,000 to 150,000, preferably ranging from 70,000 to 110,000 and more preferably ranging from 80,000 to 100,000.

Preferably, the (methyl)acrylate based copolymers (B) are formed by a copolymerization using 92% to 99% methacrylate-type monomer units and 1% to 8% acrylate series monomer units by weight of (B) as the start material; and 0 to 7% vinyl-group-containing polymerizable monomer units by weight of (B) may be added depending on the need of the processing condition.

Since the methacrylate-type monomer units used to synthesis the (methyl)acrylate based copolymers (B) can be identical to the methacrylate-type monomer units (a1-1) used to synthesis the (methyl)acrylate-styrene based copolymer (A), thus the detailed composition thereof will not redundantly described here. Similarly, the acrylate series monomer units used to synthesis the (methyl)acrylate based copolymers (B) can be identical to the acrylate series monomer units (a1-2) used to synthesis the (methyl)acrylate-styrene based copolymer (A), the detailed composition of the acrylate series monomer units will not redundantly described here. However, it should be appreciated that the methacrylate-type monomer units (a1-1) and the acrylate series monomer units (a1-2) can be respectively formed by a polymerization either using one single kind of monomers or selecting two kinds of monomers as the start material. The vinyl-group-containing polymerizable monomer used to synthesis the (methyl)acrylate based copolymers (B) can be selected from a group consisting of styrene series monomer units that is identical to the styrene series monomer units (a2) used to synthesis the (methyl)acrylate-styrene based copolymer (A), polymerizable monomer units that is identical to the other-polymerizable monomer units (a3) used to synthesis the (methyl)acrylate-styrene based copolymer (A) and the combination thereof. The detailed composition of the acrylate series monomer units also will not redundantly described here. In one embodiment of the present invention, the methacrylate-type monomer units (a1-1) used to synthesis the (methyl)acrylate based copolymers (B) can be selected from a group consisting of MMA monomer units, ethyl methacrylate monomer units, n-butyl methacrylate monomer units and the arbitrary combinations thereof. The acrylate series monomer units (a1-2) used to synthesis the (methyl)acrylate based copolymers (B) can be selected from a group consisting of methyl acrylate monomer units, ethyl acrylate monomer units, butyl acrylate monomer units and the arbitrary combinations thereof.

In some embodiments of the present invention, the (methyl)acrylate based copolymers (B) can be formed by solution polymerization or bulk polymerization. The polymerization preferably takes place in the presence of suitable solvent for preventing the viscosity of the reactants from being increased steeply and exceeding a critical level which may lead the polymerization uncontrollable. The viscosity of the reactants is typically estimated by calculated the solid content of the crude copolymer during the polymerization for forming the (methyl)acrylate based copolymers (B). The solvent contents is preferably adjusted to make the solid content of the crude polymer substantially lower than 50 wt %, more preferably is lower than 40 wt %.

(C) Core-Shell Copolymers

The core-shell copolymers (C) includes a core portion and a shell portion. In some embodiments of the present invention, each of the core-shell copolymers (C) has a core portion and a shell portion at least partially covering the core portion. In some embodiment, the core portion is mainly composed by alkylacrylate-type monomer units selected from a group consisting of butyl acrylate monomer units, ethyl acrylate monomer units, isobutyl acrylate monomer units and the arbitrary combination thereof. The alkylacrylate-type monomer units used to compose the core portion preferably comprises butyl acrylate. The core portion further includes no more than 20% vinyl-group-containing polymerizable monomers by weight of the core portion and other polymerizable monomer units. Since the vinyl-group-containing polymerizable monomers used to synthesis the core portion is identical to the styrene series monomer units (a2) used to synthesis the (methyl)acrylate-styrene based copolymer (A), and the polymerizable monomer units used to synthesis the core portion is identical to the other-polymerizable monomer units (a3) used to synthesis the (methyl) acrylate-styrene based copolymer (A), thus the detail composition of the core portion will not redundantly described here.

The core portion can also include no more than 5% crosslinking monomers having two or more conjugated bonds with equal or no more than 5% grafted monomers having two or more non-conjugated bonds or with unequal activity by weight of the core portion. The crosslinking monomers can be ethylene diacrylate, butanediol diacrylate, butanediol dimethacrylate or the arbitrary combinations thereof. The grafted monomers can be diallyl maleate, allyl methacrylate or the combination thereof.

The shell portion is made of a material mainly selected from (methyl)acrylate-containing monomer units. Exemplary (methyl)acrylate-containing monomer units may be the methacrylate-type monomer units (a1-1), the acrylate series monomer units (a1-2) and the hydroxyl-group-containing methacrylate-type monomer units (a1-3) used to synthesis the (methyl)acrylate-styrene based copolymer (A) or the combination thereof, and the detailed composition thereof will not redundantly described here. The (methyl) acrylate-containing monomer units used to form the shell portion preferably is MMA. The shell portion may further include vinyl-group-containing polymerizable monomers, for example the styrene series monomer units (a2) or the other-polymerizable monomer units (a3) used to synthesis the (methyl)acrylate-styrene based copolymer (A) or the combination thereof, and the detailed composition thereof will not redundantly described here. In some embodiments, the shell portion of the core-shell copolymers (C) preferably includes 60% (methyl)acrylate-containing monomer units and no more than 40 vinyl-group-containing polymerizable monomers by weight of the shell portion.

In one embodiment of the present invention, the (methyl) acrylate-containing monomer units used to form the core portion and the shell portion of the core-shell copolymers (C) can be implemented by commercial products Durastrength® 200, 300 and 500 provided by ARKEMA Company Limited.

In another embodiment of the present invention, the core-shell copolymers (C) includes a butadiene core portion consisting of butadiene core copolymers and a shell portion partially or thoroughly covering the butadiene core portion, wherein the butadiene core portion has a glass transition temperature (Tg) substantially higher than that of the shell portion.

The method for forming the core-shell copolymers (C) includes steps of grafting rigid copolymers to form the shell portion on the surface of the (flexible) butadiene core portion, wherein the butadiene core portion is softer than the shell portion. The rigid copolymers for forming the shell portion can be (but not limited to) the plastic copolymer composed by butadiene, butyl methacrylate, styrene and ethyl acrylate-containing monomer units. For example, the plastic copolymer can be composed by polybutadiene or polybutadiene copolymer. In one embodiment, the plastic copolymer can be methacrylate-butadiene-styrene (MBS) copolymer that is formed by a polymerization using MMA as start material and taking place in the presence of polybutadiene or polybutadiene copolymer.

In some embodiments of the present invention, the core portion of the core-shell copolymers (C) comprises more than 50% butadiene monomer units by weight of the core-shell copolymers (C), and the core portion comprises a material selected from a group consisting of polybutadiene, polybutadiene copolymers, methacrylate-butadiene-styrene (MBS) copolymers and arbitrary combinations thereof.

Since the material used to form the shell portion of the core-shell copolymers (C) have be described above, thus the detailed composition thereof will not redundantly described here.

The resin composition for laser marking may further includes some functional additives, such as plasticizers, processing aids, UV stabilizers, UV absorbers, bulking agents, reinforcing agents, stains, lubricants, anti-static additives, flame retardants, flame-retardant assistants, heat stabilizer, anti-high temperature tarnishing agents, coupling agent or other additives. Of note that, the aforementioned functional additives can be added at any time either prior to or during the polymerization process for synthesizing the resin composition. For example, the functional additives can be added either prior to the step for condensing the crude product or during the step for extruding the end product of the resin composition.

In some embodiments of the present embodiments, the core-shell copolymers (C) having the butadiene core portion and the shell portion can be implemented by using FORMOLON® M-51 and high impact modifier MP505 (MBS graft copolymers) provided by Formosa Plastics Corporation (TW), PARALOID® BTA-753 provided by Rohm & Hass Company (USA), KANE ACE® B-564 provided by Kaneka Texas Corporation (USA), Geloy® 1020 provided by General Electric Company (USA) as start materials.

The method for forming the resin composition for laser marking may include steps as follows: the (methyl)acrylate-styrene based copolymers (A), the (methyl)acrylate based copolymers (B) and the core-shell copolymers (C) are firstly mixed, and the carbon black (D) is then added in to the reaction. Subsequently, the mixture of (A), (B), (C) and (D) is feed into a plastic extruding machine and reacts at a temperature about 235° C., and the extruded pellets can be the resin composition. In some embodiments, a twin-screw extruder, IKEGAI PCM30, provided by IKEGAI Corp. (Japan) may be applied to form the method for forming the resin composition.

Exemplary Embodiments

Embodiment for Preparing the (Methyl)Acrylate-Styrene Based Copolymers (A1)

56.3 wt % styrene and 43.7 wt % methyl methacrylate (MMA) are fed continuously into a complete-mix reactor to perform a continuous solution polymerization at about 100° C. and about 600 torr. After the fed components are well mixed-up and retained for about 3.5 hours, the resulting reactant is then pick up from the complete-mix reactor and put into a horizontal laminar flow reactor operated. The operating temperature of the horizontal laminar flow reactor may be increased from 115° C. to 160° C. by a temperature gradient method, and the steady temperature is retained for about 5 hours, whereby a copolymer solution is formed. Subsequently, the copolymer solution is shift into a devolatilizing equipment from the horizontal laminar flow reactor to perform a devolatilization process, so as to from the (methyl)acrylate-styrene based copolymers (A1). During the devolatilization process, the temperature of the copolymer solution is increased to 235° C., and the operating pressure is reduced. The resulted (methyl)acrylate-styrene based copolymers (A1) may include 44 wt % MMA monomer units and 56 wt % styrene monomer units. The resulted (methyl)acrylate-styrene based copolymers (A1) may have a weight-average molecular weight about 150,000 and a melt flow rate ($MVR_{(260° C. \times 5 kg)}$) equal to 1.8.

Embodiment for Preparing the (Methyl)Acrylate-Styrene Based Copolymers (A2)

74.5 wt % styrene and 25.4 wt % MMA are fed continuously into a complete-mix reactor to perform a continuous solution polymerization at about 100° C. and about 600 torr. After the fed components are well mixed-up and retained for about 3.5 hours, the resulting reactant is then pick up from the complete-mix reactor and put into a horizontal laminar flow reactor operated. The operating temperature of the horizontal laminar flow reactor may be increased from 115° C. to 160° C. by a temperature gradient method, and the steady temperature is retained for about 5 hours, whereby a copolymer solution is formed. Subsequently, the copolymer solution is shift into a devolatilizing equipment from the horizontal laminar flow reactor to perform a devolatilization process, so as to from the (ethyl)acrylate-styrene based copolymers (A2). During the devolatilization process, the temperature of the copolymer solution is increased to 235° C., and the operating pressure is reduced. The resulted (methyl)acrylate-styrene based copolymers (A2) may include 70 wt % MMA monomer units and 30 wt % styrene monomer units. The resulted (methyl)acrylate-styrene based copolymers (A) may have a weight-average molecular weight about 90,000 and a melt flow rate ($MVR_{(260° C. \times 5 kg)}$) equal to 2.1.

Preparing of the (Methyl)Acrylate Based Copolymers (B1)

95 parts of MMA, 5 parts of methyl acrylate, 0.4 dodecyl mercaptan, 0.08 parts of 2,2'-azobis(2-methylpropionitrile) and 66 parts of toluene are fed continuously into a complete-mix reactor having a thermal conductive oil-filled sandwich construction to perform a continuous solution polymerization at about 100° C. and about 600 torr. After the fed components are well mixed-up, the temperature of the reactant is increased to 265° C. to form a copolymer solution. The copolymer solution is then subjected to a devolatilization process and an extrusion process to form at least one extruded strip body. After the strip body is cooled down and cut into a plurality of plastic pellets, the process for forming (methyl)acrylate based copolymers (B1) is completed. In the present embodiment, the resulted (methyl)acrylate based copolymers (B1) 97 wt % MMA monomer units and 3 wt % methyl acrylate monomer units. The resulted (methyl)acrylate based copolymers (B1) may have a weight-average molecular weight about 100,000 and a melt flow rate ($MVR_{(230° C. \times 38 kg)}$) equal to 1.9.

Preparing of the (Methyl)Acrylate Based Copolymers (B2)

89 parts of MMA, 11 parts of methyl acrylate, 0.54 dodecyl mercaptan, 0.11 parts of 2,2'-azobis(2-methylpropionitrile) and 66 parts of toluene are fed continuously into a complete-mix reactor having a thermal conductive oil-filled sandwich construction to perform a continuous solution polymerization at about 100° C. and about 600 torr. After the fed components are well mixed-up, the temperature of the reactant is increased to 265° C. to form a copolymer solution. The copolymer solution is then subjected to a devolatilization process and an extrusion process to form at least one extruded strip body. After the strip body is cooled down and cut into a plurality of plastic pellets, the process for forming (methyl)acrylate based copolymers (B2) is completed. In the present embodiment, the resulted (methyl)acrylate based copolymers (B2) 90 wt % MMA monomer units and 10 wt % methyl acrylate monomer units. The resulted (methyl)acrylate based copolymers (B2) may have a weight-average molecular weight about 65,000 and a melt flow rate ($MVR_{(230° C. \times 38 kg)}$) equal to 17.

Regarding to Table 1, a plurality of resin compositions for laser marking composed by (methyl)acrylate-styrene based copolymers (A1/A2), (methyl)acrylate based copolymers (B1/B2) and core-shell copolymers (C) with various concentrations are provided. In these embodiment, the core-shell copolymers (C) that has butadiene core portion can be implemented by FORMOLON® M-51 (hereinafter referred to as M-51(C)); and the core-shell copolymers (C) that has methyl acrylate core portion can be 2.0 implemented by Durastrength® 300 (hereinafter referred to as DS-300(C)). Wherein the M-51(C) includes 28 mol % MMA monomer units, 72% butadiene monomer units; DS-300(C) includes 100 wt % (methyl)acrylate-containing monomer units. The resin compositions for laser marking which are designated as embodiment 1 to 15 respectively are formed by extrusion-pelletizing process and includes various concentrations of carbon black (D). The amount of the various monomer units can be determined by the measurements of a nuclear magnetic resonance (NMR) BRUKER-NMR 400 MHz provided by Bruker Corporation.

TABLE 1

| | EB 1 | EB 2 | EB 3 | EB 4 | EB 5 | EB 6 | EB 7 | EB 8 |
|---|---|---|---|---|---|---|---|---|
| A1 (wt %) | 72 | 72 | 72 | 76 | 76 | 76 | 80 | 80 |
| A2 (wt %) | 0 | 0 | 0 | 0 | 0 | 0 | 0 | 0 |
| B1 (wt %) | 8 | 8 | 8 | 4 | 4 | 4 | 0 | 0 |
| M-51(C) (wt %) | 20 | 20 | 20 | 20 | 20 | 20 | 20 | 20 |
| DS-300(C) (wt %) | 0 | 0 | 0 | 0 | 0 | 0 | 0 | 0 |
| carbon black (D) (phr) | 0.05 | 0.054 | 0.058 | 0.054 | 0.058 | 0.062 | 0.052 | 0.056 |
| amount of butadiene monomer units (wt %) | 14.4 | 14.4 | 14.4 | 14.4 | 14.4 | 14.4 | 14.4 | 14.4 |
| amount of (methyl)acrylate-containing monomer units (a1-1)(a1-2)(a1-3) (wt %) | 45.3 | 45.3 | 45.3 | 43.0 | 43.0 | 43.0 | 40.8 | 40.8 |
| amount of styrene series monomer units (a2) (wt %) | 40.3 | 40.3 | 40.3 | 42.6 | 42.6 | 42.6 | 44.8 | 44.8 |
| (methyl)acrylate-containing monomer units/styrene series monomer units | 1.12 | 1.12 | 1.12 | 1.01 | 1.01 | 1.01 | 0.9 | 0.9 |
| MVR$_{(260°\,C.\,\times\,5\,kg)}$ | 22.98 | 23.73 | 23.53 | 25.16 | 25.28 | 25.71 | 25.40 | 26.33 |
| Izod$_{(1/4)}$ | 3.7 | 3.7 | 3.7 | 3.7 | 3.7 | 3.7 | 3.7 | 3.7 |
| FDI | 200 g × 1000 mm | 200 g × 1000 mm | 200 g × 1000 mm | 200 g × 900 mm | 200 g × 900 mm | 200 g × 900 mm | 200 g × 800 mm | 200 g × 800 mm |
| check with eyes | ◎ | ◎ | ◎ | ◎ | ◎ | ◎ | ◎ | ◎ |
| processing characteristics | ◎ | ◎ | ◎ | ◎ | ◎ | ◎ | ◎ | ○ |

| | EB 9 | EB 10 | EB 11 | EB 12 | EB 13 | EB 14 | EB 15 |
|---|---|---|---|---|---|---|---|
| A1 (wt %) | 80 | 0 | 0 | 0 | 20 | 0 | 0 |
| A2 (wt %) | 0 | 72 | 74 | 80 | 30 | 40 | 50 |
| B1 (wt %) | 0 | 8 | 6 | 0 | 30 | 40 | 30 |
| M-51(C) (wt %) | 20 | 20 | 20 | 20 | 20 | 20 | 20 |
| DS-300(C) (wt %) | 0 | 0 | 0 | 0 | 0 | 0 | 0 |
| carbon black (D) (phr) | 0.06 | 0.06 | 0.06 | 0.06 | 0.06 | 0.06 | 0.06 |
| amount of butadiene monomer units (wt %) | 14.4 | 14.4 | 14.4 | 14.4 | 14.4 | 14.4 | 14.4 |
| amount of (methyl)acrylate-containing monomer units (a1-1)(a1-2)(a1-3) (wt %) | 40.8 | 61.48 | 60.88 | 59.08 | 62.88 | 71.08 | 68.08 |
| amount of styrene series monomer units (a2) (wt %) | 44.8 | 24.12 | 24.72 | 26.52 | 22.72 | 14.52 | 17.52 |
| (methyl)acrylate-containing monomer units/styrene series monomer units | 0.9 | 2.55 | 2.46 | 2.23 | 2.77 | 4.90 | 3.89 |
| MVR$_{(260°\,C.\,\times\,5\,kg)}$ | 26.98 | 44.82 | 46.13 | 48.42 | 24.21 | 19.72 | 22.36 |
| Izod$_{(1/4)}$ | 3.7 | 4.2 | 4.2 | 4.3 | 4.1 | 4.7 | 4.5 |
| FDI | 200 g × 800 mm | 300 g × 100 mm | 300 g × 800 mm | 300 g × 600 mm | 300 g × 350 mm | 400 g × 1000 mm | 400 g × 600 mm |
| check with eyes | ◎ | ◎ | ◎ | ◎ | ◎ | ◎ | ◎ |
| processing characteristics | ○ | ◎ | ◎ | ◎ | ◎ | ◎ | ◎ |

* EB1-EB15 represents the Embodiments 1-15.

Comparison embodiments are provided in Table 2;

TABLE 2

|  | CE1 | CE2 | CE3 | CE4 | CE5 | CE6 |
|---|---|---|---|---|---|---|
| (A1) (wt %) | 27.9 | 46.5 | 63.6 | 83.3 | 90.9 | 90.9 |
| B2 (wt %) | 65.1 | 46.5 | 27.3 | 0 | 0 | 0 |
| M-51(C) (wt %) | 7 | 7 | 0 | 12.5 | 9.1 | 0 |
| DS-300(C) (wt %) | 0 | 0 | 9.1 | 4.2 | 0 | 9.1 |
| carbon black (D) (phr) | 0.3 | 0.05 | 0.06 | 0.03 | 0.06 | 0.06 |
| amount of butadiene monomer units(wt %) | 5.0 | 5.0 | 0 | 9.0 | 6.5 | 0 |
| amount of (methyl)acrylate-containing monomer units (a1-1)(a1-2)(a1-3) (wt %) | 79.3 | 68.9 | 64.4 | 44.4 | 42.5 | 49.1 |
| amount of styrene series monomer units (a2) (wt %) | 15.6 | 26.0 | 35.6 | 46.6 | 50.9 | 50.9 |
| (methyl)acrylate-containing monomer units/styrene series monomer units | 5.8 | 2.65 | 1.8 | 0.95 | 0.83 | 0.96 |
| $MVR_{(260° C. \times 5 kg)}$ | 74.24 | 59.27 | 44.28 | 29.96 | 36.03 | 38.74 |
| $Izod_{(1/4)}$ | 3.6 | 3.8 | 3.2 | 3.7 | 3.6 | 3.5 |
| FDI | 200 g × 100 mm | 200 g × 800 mm | 200 g × 400 mm | 200 g × 600 mm | 200 g × 400 mm | 200 g × 100 mm |
| check with eyes | X | X | X | X | X | X |

* CE1-CE6 represents the Comparison embodiment 1-6.

The embodiments 1 to 15 and the comparison embodiments 1 to 6 are subjected to various tests for evaluating MVR index, IZOD impact strength (referred to as $Izod_{(1/4)}$), falling dart impact (FDI) strength thereof; and then are respectively marked by a Nd-YAG laser beam (e.g. provided by TYREX-DP50 Laser of Wuhan Questt Asia Technology Co., Ltd) having an output power tenability of 80~100%, a scanning speed of 200~1300 mm/s and a frequency of 4~28 kHz to form a mark thereon. The resulted marks are checked with eyes to determine whether the color remains bright white or changes to brown. If two marks formed on the same resin composition by either high energy pulsed laser beam or low energy pulsed laser beam can both remain bright white, the checked result can be referred to as ⊚, if one of these two marks remains bright white, the checked result can be referred to as ○. In these embodiments, the low energy pulsed laser beam has an output power tenability of 80%, a scanning speed of 1300 mm/s and a frequency of 4 kHz; and the high energy pulsed laser beam has an output power tenability of 100%, a scanning speed of 200 mm/s and a frequency of 28 kHz.

In the embodiments 1-6, 10-11 and 13-15, since the resin comprises (methyl)acrylate-styrene based copolymers (A), (methyl)acrylate based copolymers (B) and core-shell copolymers (C), thus the amount of the butadiene monomer units, the (methyl)acrylate-containing monomer units (a1-1), (a1-2) and (a1-3), the styrene series monomer units (a2) are calculated by weight of monomer units comprised in the (methyl)acrylate-styrene based copolymers (A), the (methyl)acrylate based copolymers (B) and the core-shell copolymers (C) of the resin compositions for laser marking.

In the embodiments 7-9 and 12, since the resin comprises (methyl)acrylate-styrene based copolymers (A) and core-shell copolymers (C), thus the amount of the butadiene monomer units, the (methyl)acrylate-containing monomer units (a1-1), (a1-2) and (a1-3), the styrene series monomer units (a2) are calculated by weight of monomer units comprised in the (methyl)acrylate-styrene based copolymers (A), and the core-shell copolymers (C) of the resin compositions for laser marking.

The MVR indexes (e.g. $MVR_{(260° C. \times 5 kg)}$) are measured in accordance with ISO 1133 procedure which includes steps as follows: A sample is put in a chamber (piston cylinder) and the sample temperature is raised to 265° C. Subsequently, a 5 Kgw pressure provided by a piston head is then applied to push the sample downwards for 10 minutes, and the amount of the sample that is pushed out of the chamber is calculated and referred to as the MVR index (g/10 min). The $Izod_{(1/4)s}$ ($KJ/m^2$) are measured in accordance with ISO 180 procedure. FDI strength can be obtained by performing the following process: The resin compositions provide by the embodiments 1 to 15 and the comparison embodiments 1 to 6 are subjected to a plastic injection to form a plurality of plastic testing disks which has a diameter of 55 mm and a thickness of 2.0 mm (diameter×thickness/55 mm×2.0 mm) respectively. A Falling Dart Impact Tester provided by TOYO SEIKI CO., LTD. Company (Japan) is applied to determine the impact energy (g×mm) of the free-falling dart from various certain height against the testing disks.

The testing results of the embodiments 1 to 15 and the comparison embodiments 1 to 6 indicate that when the resin composition includes 0.01 to 0.25 parts of carbon black (0) for each 100 parts by weight of the resin; the weight ratio of the (methyl)acrylate-containing monomer units to the styrene series monomer units ranges from 0.85 to 5; and the concentration of the butadiene monomer units involved in the resin composition is more than 12.5% by weight of the resin composition, the portion of the resin composition subjected to the laser radiation may have a bright white color, whereby a clear mark can be obtained. When the concentration of the butadiene monomer units involved in the resin composition is more than 21.5% by weight of the resin composition, violent foaming decomposition may occur on the portion of the resin composition subjected to the laser radiation, and the color of the foaming portion may change to brown, whereby the mark formed on the surface of the resin composition may be blurred and unidentified. The impact energy (g×mm) of the comparison embodiments 1 and 6 are about 200 g×100 mm which can indicate that the processing characteristics thereof are not good enough for industry application. In contrary, the resin composition of the embodiments 1 to 15 that includes 40 to 83% (methyl) acrylate-styrene based copolymers (A), 0 to 45% (methyl) acrylate based copolymers (B) and 10% to 35% M-51(C) by weight of the resin have better processing characteristics in comparison with the comparison embodiments 1 to 6, and the laser mark form on the resin composition of the embodiments 1 to 15 may have color in bright white rather than brown.

In addition, it should be appreciated that the M-51(C) and DS-300(C) may also be applied to take the place of the core-shell copolymers (C) for forming the resin composition under the same conditions, and the MVR index, IZOD impact strength, falling dart impact strength measured from the resin composition applying M-51(C) or DS-300(C) may similar to that of the resin composition applying the core-shell copolymers (C). It can be indicated that resin composition applying M-51(C) or DS-300(C) may also have processing characteristics, and the laser mark form thereon may have color in bright white rather than brown.

In sum, the laser mark formed on the resin composition provided by the aforementioned embodiments may have color in bright white and can be clearly identified.

It will be apparent to those skilled in the art that various modifications and variations carp be made to the disclosed embodiments. It is intended that the specification and examples be considered as exemplary only, with a true scope of the invention being indicated by the following claims and their equivalents.

What is claimed is:

1. A resin composition for laser marking, comprising:
   a resin comprising 40% to 83% (methyl)acrylate-styrene based copolymers (A), greater than 0 to 45% (methyl) acrylate based copolymers (B) and 10% to 35% core-shell copolymers (C) by weight; and
   laser absorbers comprising 0.01 to 0.25 parts of carbon black (D) for each 100 parts by weight of the resin;
   wherein the (methyl)acrylate-styrene based copolymer (A) comprises 40% to 80% (methyl)acrylate-containing monomer units, 20% to 60% styrene-containing monomer units and 0% to 30% other-polymerizable monomer units by weight;
   the (methyl)acrylate based copolymers (B) comprises 92% to 99% methacrylate-type monomer units, 1% to 8% acrylate series monomer units and 0 to 7% vinyl-group-containing polymerizable monomer units by weight and has a weight-average molecular weight ranging from 70,000 to 150,000;
   each of the core-shell copolymers (C) has a core portion and a shell portion covering the core portion; the core portion includes a material selected from a group consisting of butadiene monomer units, (methyl)acrylate-containing monomer units and combinations thereof, and the shell portion is made of a material selected from (methyl)acrylate-containing monomer units.

2. The resin composition for laser marking as claimed in claim 1, wherein the resin comprising 40% to 80% of the (methyl)acrylate-styrene based copolymers (A), greater than 0 to 40% of the (methyl)acrylate based copolymers (B) and 10% to 30% of the core-shell copolymers (C) by weight.

3. The resin composition for laser marking as claimed in claim 1, wherein the resin comprising 40% to 80% of the (methyl)acrylate-styrene based copolymers (A), 2% to 40% of the (methyl)acrylate based copolymers (B) and 10% to 28% of the core-shell copolymers (C) by weight.

4. The resin composition for laser marking as claimed in claim 1, wherein the core portion comprises more than 50% butadiene monomer units by weight of the core-shell copolymers (C), and the core portion comprises a material selected from a group consisting of polybutadiene, polybutadiene copolymers, methacrylate-butadiene-styrene (MBS) copolymers and combinations thereof.

5. The resin composition for laser marking as claimed in claim 4, wherein the shell portion of the core-shell copolymers (C) comprises more than 60% (methyl)acrylate-containing monomer units by weight.

6. The resin composition for laser marking as claimed in claim 5, wherein the (methyl)acrylate-containing monomer units are selected from a group consisting of methyl methacrylate (MMA) monomer units, ethyl methacrylate monomer units, n-butyl methacrylate monomer units and combinations thereof.

7. The resin composition for laser marking as claimed in claim 1, wherein the other-polymerizable monomer units are selected from a group consisting of acrylonitrile monomer units, styrene monomer units, maleic acid anhydride monomer units, a-methyl styrene monomer units and the combinations thereof.

8. A resin composition for laser marking, comprising:
   a resin comprising 40% to 83% (methyl)methacrylate-styrene based copolymers (A), greater than 0 to 45% (methyl)acrylate based copolymers (B) and 10% to 35% core-shell copolymers (C); and
   laser absorbers comprising 0.01 to 0.25 parts of carbon black (D) for each 100 parts by weight of the resin;
   wherein each of the core-shell copolymers (C) has a core portion and a shell portion covering the core portion; the core portion is made of a material manly selected from butadiene monomer units, and the shell portion is made of a material selected from (methyl)acrylate-containing monomer units;
   (Methyl)acrylate-containing monomer units and styrene-containing monomer units are from the resin; the weight ratio of the (methyl)acrylate-containing monomer units to the styrene-containing monomer units ranges from 0.85 to 5; and the resin composition include 12.5% to 21.5% butadiene monomer units by weight of the resin composition.

9. The resin composition for laser marking as claimed in claim 8, further comprising (methyl)acrylate based copolymers (B), wherein the laser absorbers comprises 0.01 to 0.25 parts of carbon black (D) for each 100 parts by weight of the (methyl)acrylate-styrene based copolymers (A), the (methyl)acrylate based copolymers (B) and the core-shell copolymers (C).

10. The resin composition for laser marking as claimed in claim 8, wherein the weight ratio of the (methyl)acrylate-containing monomer units to the styrene-containing monomer units ranges from 0.9 to 4.9.

11. The resin composition for laser marking as claimed in claim 8, wherein the resin comprises 35% to 75% of the (methyl)acrylate-styrene based copolymers, 10% to 50% styrene-containing monomer units and 12.5% to 21.5% butadiene monomer units by weight.

12. A molding product made of a resin composition for laser marking,
   wherein the resin composition comprises:
   40% to 83% (methyl)acrylate-styrene based copolymers (A), greater than 0 to 45% (methyl)acrylate based copolymers (B) and 10% to 35% core-shell copolymers (C) by weight; and
   laser absorbers comprising 0.01 to 0.25 parts of carbon black (D) for each 100 parts by weight of the resin;
   wherein the (methyl)acrylate-styrene based copolymer (A) comprises 40% to 80% (methyl)acrylate-containing monomer units, 20% to 60% styrene-containing monomer units and 0% to 30% other-polymerizable monomer units by weight;
   the (methyl)acrylate based copolymers (B) comprises 92% to 99% methacrylate-type monomer units, 1% to 8% acrylate series monomer units and 0 to 7% vinylgroup-containing polymerizable monomer units by weight and has a weight-average molecular weight ranging from 70,000 to 150,000;

each of the core-shell copolymers (C) has a core portion and a shell portion covering the core portion; the core portion includes a material selected from a group consisting of butadiene monomer units, (methyl)acrylate-containing monomer units and combinations thereof, and the shell portion is made of a material selected from (methyl)acrylate-containing monomer units.

13. The molding product as claimed in claim 12, wherein the resin comprising 40% to 80% of the (methyl)acrylate-styrene based copolymers (A), greater than 0 to 40% of the (methyl)acrylate based copolymers (B) and 10% to 30% of the core-shell copolymers (C) by weight.

14. The molding product as claimed in claim 12, wherein the core portion comprises more than 50% butadiene monomer units by weight of the core-shell copolymers (C), and the core portion comprises a material selected from a group consisting of polybutadiene, polybutadiene copolymers, methacrylate-butadiene-styrene (MB S) copolymers and combinations thereof.

15. The molding product as claimed in claim 14, wherein the shell portion of the core-shell copolymers (C) comprises more than 60% (methyl)acrylate-containing monomer units by weight, and the (methyl)acrylate-containing monomer units are selected from a group consisting of methyl methacrylate (MMA) monomer units, ethyl methacrylate monomer units, n-butyl methacrylate monomer units and combinations thereof.

16. The molding product as claimed in claim 12, wherein the other-polymerizable monomer units are selected from a group consisting of acrylonitrile monomer units, styrene monomer units, maleic acid anhydride monomer units, a-methyl styrene monomer units and the combinations thereof.

17. The molding product as claimed in claim 12, wherein (methyl)acrylate-containing monomer units and styrene-containing monomer units are from the resin; the weight ratio of the (methyl)acrylate-containing monomer units to the styrene-containing monomer units ranges from 0.85 to 5; and the resin composition include 12.5% to 21.5% butadiene monomer units by weight of the resin composition.

18. The molding product as claimed in claim 17, wherein the weight ratio of the (methyl)acrylate-containing monomer units to the styrene-containing monomer units ranges from 0.9 to 4.9.

19. The molding product as claimed in claim 17, wherein the resin comprises 35% to 75% of the (methyl)acrylate-styrene based copolymers, 10% to 50% styrene-containing monomer units and 12.5% to 21.5% butadiene monomer units by weight.

* * * * *